P. BROADBOOKS.
SHEARS FOR SHEARING METAL.
APPLICATION FILED MAR. 21, 1916.
1,218,521.
Patented Mar. 6, 1917.
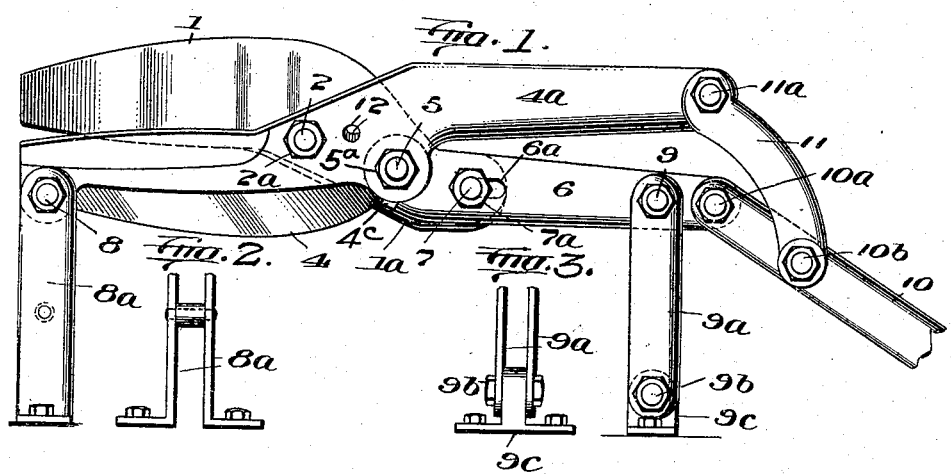
Witnesses
Philip E. Barnes
G. K. Kifer
Inventor
Peter Broadbooks
By Alexander Powell
Attorneys

UNITED STATES PATENT OFFICE.

PETER BROADBOOKS, OF BATAVIA, NEW YORK.

SHEARS FOR SHEARING METAL.

1,218,521.          Specification of Letters Patent.          Patented Mar. 6, 1917.

Application filed March 21, 1916. Serial No. 85,670.

*To all whom it may concern:*

Be it known that I, PETER BROADBOOKS, a citizen of the United States, residing at Batavia, in the county of Genesee and State of New York, have invented certain new and useful Improvements in Shears for Shearing Metal; and I hereby declare that the following is a full, clear, and exact description thereof, reference being had to the accompanying drawings, which form part of this specification.

This invention relates to metal cutting shears, and the object of the invention is to provide shears especially adapted for tinners' use, and wherein the weight of the shears is utilized in the shearing action so they will cut the material with greater ease.

I will explain the invention as illustrated in the accompanying drawings and set forth in the claims the features and combinations of parts for which protection is desired.

In said drawings:

Figure 1 shows the shears provided with amplifying levers to adapt same for shearing heavy metal.

Figs. 2 and 3 are details of the supports for the shears shown in Fig. 1.

Each of the shears comprises a main cutting jaw 1 and a minor cutting jaw 4; these jaws are pivotally connected by a bolt 2 which may be secured by a nut $2^a$.

The minor jaw 4 is preferably rigidly connected with a main lever $4^a$ which extends in rear of the pivot 2, and forms one of the handle levers of the shears. This jaw 4 is provided in rear of the pivot 2, with a complemental pivotal connection or bearing $4^c$ to which is pivoted the end of a lever 6 attached thereto by a pivot bolt 5 secured by a nut $5^a$.

The jaw 4 and lever 6 lie in the same plane and lever 6 lies close against an extension or shank $1^a$ of the jaw 1, which shank projects rearwardly from the pivot 2 and beyond the pivot 5; and to the outer end of this shank $1^a$ is attached a bolt 7 which extends through a slot $6^a$ in the lever 6 and may be secured by a nut $7^a$ as shown. The construction is such that lever 6 acts on the rearward extension of the jaw 1 and exerts a compound leverage upon jaw 1 thereby insuring a powerful shearing action by the jaw.

In the construction shown the jaw 4 is attached by means of a bolt 8 to a standard $8^a$ which may be rigidly fastened to a work bench, and lever 6 may be pivotally connected by a bolt 9 to the upper ends of links $9^a$, the other ends of which are pivotally connected by a bolt $9^b$ to a bracket $9^c$ fastened to the support. This construction is particularly useful for shearing heavy metal. In this construction a supplemental lever 10 is pivotally connected by a bolt $10^a$ to the outer end of lever 6; and the lever 10 is in turn pivotally connected by a bolt $10^b$ to one end of links 11, the other ends of which are pivotally connected by a bolt $11^a$ to the rear end of the lever $4^a$. In this way I obtain greatly increased leverage and adapt the shears for cutting heavy metal.

In the construction shown I not only gain a double compound leverage, but I also utilize the pressure or weight of the shear besides the weight of the operator; for lifting the lever handle 10 will at the same time raise the body of the shears, and when lever 10 is moved downward its weight is effectively added to the compound leverage of the hand lever and the actuating lever.

The shears may also be provided with one or more perforations as 12 in the jaws 1 and 4 adjacent the pivot bolt 2 for the purpose of shearing wires or rods.

My shears are expressly designed for tinners' use, and are simple, powerful, symmetrical and practical; and will be appreciated by all who may have use for tinners' shears.

What I claim is:

1. A shears for shearing metal consisting of a pair of main jaws and their actuating levers, a support pivotally connected to one of said jaws, a support pivotally connected to the actuating lever of the other of said jaws, one of said supports being pivoted to the base, whereby said shears are supported in operative position and the weight of the shears utilized in the shearing operation.

2. A shears comprising a pair of jaws pivotally connected together, and actuating levers connected with the respective jaws, a support pivotally connected to one of said jaws and fixed to a base, and a support pivotally connected to the actuating lever of the other jaw and to said base, whereby the shears are held in operative position and the weight of the shears utilized to assist in the shearing operation.

3. A shears comprising a pair of jaws pivotally connected together, a main lever rigidly connected to one of the jaws in rear of the pivot; and a support pivotally connected to the front end of said jaw; the other jaw having a shank extending in rear of the said pivot, an actuating lever pivotally connected to the main lever in rear of the jaw pivot, means slidably connecting the said shank to the actuating lever in rear of the pivotal connection of said lever to the main lever, a pivotal support for the rear end of said actuating lever, a third lever pivoted to the said actuating lever, and a link connection between the third lever and the main lever, substantially as described.

In testimony that I claim the foregoing as my own, I affix my signature.

PETER BROADBOOKS.

Copies of this patent may be obtained for five cents each, by addressing the "Commissioner of Patents, Washington, D. C."